MANUFACTURE OF ROLLER CHAIN

Original Filed June 30, 1971

United States Patent Office

Re. 28,169
Reissued Sept. 24, 1974

28,169

MANUFACTURE OF ROLLER CHAIN

George A. Zimmer, Ithaca, N.Y., assignor to
Borg-Warner Corporation, Chicago, Ill.

Original No. 3,706,199, dated Dec. 19, 1972, Ser. No. 158,199, June 30, 1971. Application for reissue June 4, 1973, Ser. No. 366,948
Int. Cl. B211 *9/02*
U.S. Cl. 59—8 2 Claims

Matter enclosed in heavy brackets [ ] appears in the original patent but forms no part of this reissue specification; matter printed in italics indicates the additions made by reissue.

ABSTRACT OF THE DISCLOSURE

To improve retention of the cylindrical bushings in the side plates of a roller chain, the bushing surfaces are roughened, as by shot-peening, fine knurling or fine scoring, prior to hardening. Thereafter, a side plate is press fitted on each end of the bushing, and the chain is assembled.

BACKGROUND OF THE INVENTION

In the manufacture of roller chains or the like, side plates are press fitted onto cylindrical bushings. The standard practice has been to make the hole in the side plate a few thousandths of an inch less in diameter than the outside of the bushing, and, after the separate parts are hardened, to press the side plate onto the end of the bushing.

Such a chain has only a limited ability to withstand side pressures caused by sprocket misalignment, especially when operated at high speeds, as for example, a timing chain in an automobile.

There are a combination of forces and conditions incident to operation of the chain under load and especially at high speed which the interference fit of the bushing into the plate changes the bushing from a cylindrical to a flattened barrel shape. There is also distortion or bending of the pin and bushing due to the working load or chain pull being transmitted by the chain during operation.

Articulation of the pin inside the bushing when the chain engages a sprocket under load produces a frictional torque component which tends to rotate the bushing and pin in their respective plates.

These forces, in combination, cause the roller links to move outwardly on the bushings and to lock with or rub against the adjacent pin link plates.

Various methods have been proposed to overcome these difficulties and to improve retention of the bushings by the side plates; for example, swaging or upsetting the ends of the bushing, or staking or keying the bushing into place by three or four relatively large gauges or tabs. While these methods do improve bushing retention and reduce bushing rotation, there is damage to the bushing and/or the side or link plates which results in cracking the ends of the bushing or in reducing the fatigue strength of the plates due to the stress concentration produced in notching the plates by the bushing keys or tabs.

THE INVENTION

According to this invention, retention of the bushing by the side plates is materially enhanced by slightly roughening or pitting the surface of the bushing before hardening to increase its wear resistance and resistance to deformation, and before assembly to provide asperities and/or craters which tend to lock the surfaces of the side or link plate and the bushing together upon assembly. Tests have indicated a significant improvement in retention without causing failure of the plates or bushings in severe load applications.

THE DRAWINGS

DETAILED DESCRIPTION

Figure 1:
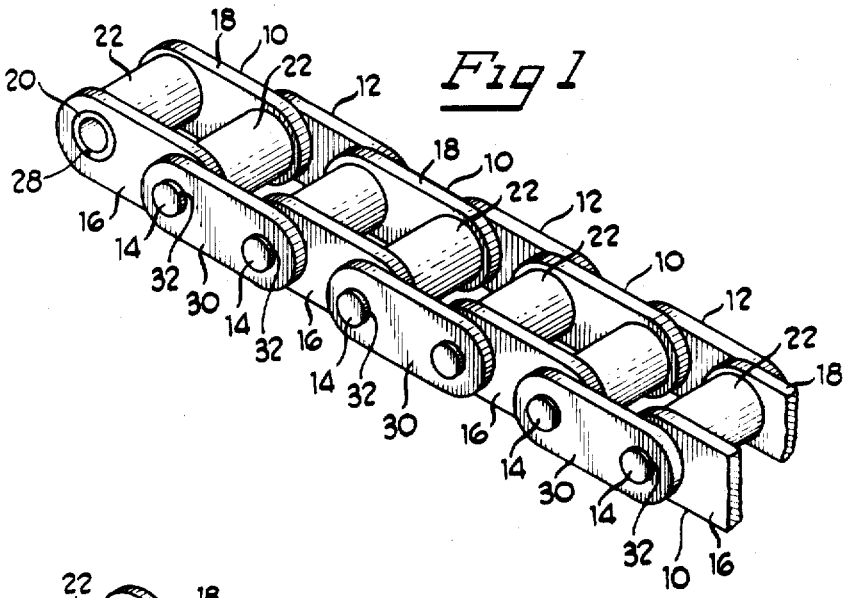
FIG. 1 is an isometric view of a typical link chain.
Figure 2:
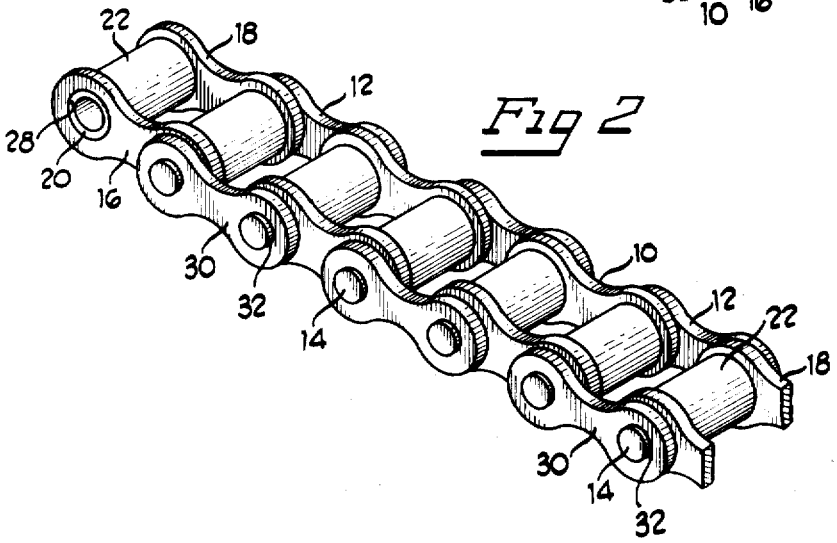
FIG. 2 is an isometric view of another type of link chain.

Referring to the drawings, typical roller chains are illustrated in FIGS. 1 and 2 and comprise primary links designated by the numeral 10 and secondary links designated by the numerals 12. The primary and secondary links are connected to one another by pins 14, which extend through the aforesaid links, as will be more fully described.

Figure 3:
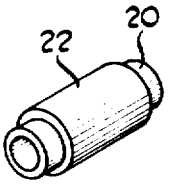
FIG. 3 is an illustration of a typical bushing and roller assembly used in the chains of FIGS. 1 and 2.

The primary links 10, are constructed of side plates 16 and 18 held rigidly in spaced relation by bushings 20, one of which is illustrated in combination with a roller in FIG. 3. The bushings 20 may be formed of bar or sheet material into a cylindrical member and are surrounded by a cylindrical roller 22. In the BS type of chain, see FIG. 1, the roller is rotatable about the bushing; in the ASA type of chain, see FIB. 2, the roller is not rotatable about the bushing. The bushings can also be constructed of suitably formed tubular stock. In any event, the side or link plates 16 and 18 are provided with holes 28 and the bushings are press or friction fitted into the holes 28 of the bushing, so that there is no relative rotation between the side plates and the bushings.

The primary links 10 are joined together by the secondary links 12 which comprise link plates 30 having spaced holes 32 to receive the pins 14 which pass through the bushings 20. Upsetting the ends of the pins 14 retains them in position. Articulation of the resultant chain is permitted by making the pins 14 of slightly less diameter than the inner diameter of the bushings.

In the application of roller chain to high speed drives, as for example, overhead camshaft timing chain on four-cylinder engines or motorcycle primary or final drives, retention of the bushing in the side or link plates, shown in the drawing as 16 and 18, is a factor which limits performance of the chain.

Drive malfunctions occur when these plates move laterally off the bushings and reduce the clearance between the pin links, shown in the drawings as 30, and the roller or side link plates. In severe service, the links or plates may be forced together and articulation of the joint is stopped completely.

As previously stated, according to this invention, bushing retention has been improved without causing damage and failure of the links or bushings in severe load applications. This is accomplished by shot-peening the bushings before they are hardened to produce a slight roughening or pitting of the bushing surface, after heat treatment, i.e., hardening, the hardened asperities and craters tend to lock the surfaces of the link plate and the bushing together. No upsetting of the bushing ends is required.

[Substantially the same improvement in retention can be accomplished by fine knurling or scoring of the bushing surfaces prior to heat treatment and hardening.]

Generally for small pitch chains, the bushings are shot peened for approximately 15 minutes with No. 70 shot.

When larger bushings are treated, a larger shot size is used, for example, a No. 110 shot is used for the bushing for a ½ inch pitch chain and a No. 110 or 170 shot size is used for the bushing for a three-fourths to 1 inch pitch chain.

To measure the intensity of shot peening standard SAE tests are used. For example, the intensity of shot peening a ⅜-inch pitch link is measured by using a N shot peening test strip, as described in SAE Standards J442 and J443 which are described in the 1963 SAE Handbook, published by the Society of Automotive Engineers, Inc., New York, N.Y., on pages 157 to 160, inclusive. For larger links, the A test strip is used.

To demonstrate the improvement in retention, a test was devised to evaluate the improvement. An assembled link and bushing were disposed over a post having one portion extending into the bushing; and another portion engaging the bushing end with a diameter smaller than the outside diameter smaller than the outside diameter of the bushing ends. A cylindrical ram was placed over the bushing to engage the plate and the force in pounds required to push the link off the bushing was measured.

For standard press fit, one not shot peened prior to hardening, a force of 163.4 lbs. was required to push the link off the bushing as compared to a force of 276.2 lbs. required to push the link off a bushing which had been shot peened prior to hardening. These figures represent the average of 50 assemblies of each construction tested.

In any case, when proceeding according to the invention, the asperities, craters, [knurls or scores] are disposed in a random pattern in the bushing and for the best effectiveness coverage should be 85 percent or higher.

I claim:

1. In the manufacture of roller chain or the like, the steps comprising:

roughing the surface of a cylindrical bushing *by shot-peening* so as to form asperities and craters on the surface thereof;

hardening the roughened bushing to increase its wear resistance and make it more resistant to deformation, and thereafter press fitting a side plate on each end of said bushing, the roughened surface increasing the bushing retention in said side plates.

[2. In the manufacture of roller chain as recited in claim 1 comprising shot-peening said cylindrical bushing to roughen its surface.]

[3. In the manufacture of roller chain as recited in claim 1 comprising fine knurling said cylindrical bushing to roughen its surface.]

[4. In the manufacture of roller chain as recited in claim 1 comprising fine scoring said cylindrical bushing to roughen its surface.]

5. In the manufacture of roller chain or the like, the steps comprising:

shot-peening the outer surface of a cylindrical bushing so as to form asperities and craters on the surface thereof;

hardening the shot-peened bushing to increase its wear resistance and make it more resistant to deformation, and thereafter press fitting a side plate on each end of said bushing, the shot-peened surface increasing the bushing retention in said side plates.

References Cited

The following references, cited by the Examiner, are of record in the patented file of this patent or the original patent.

UNITED STATES PATENTS

| | | | |
|---|---|---|---|
| Re. 22,488 | 5/1944 | Focke | 74—255 R |
| 441,815 | 12/1890 | Appleby | 74—255 R |
| 1,722,861 | 7/1929 | Renshaw | 59—8 |
| 2,431,764 | 12/1947 | McCann | 59—8 |
| 2,983,158 | 5/1961 | Hodlewsky | 59—8 |
| 3,136,664 | 6/1964 | Kuntzmann | 59—8 |
| 3,321,907 | 5/1967 | Dewing | 59—8 |
| 3,426,522 | 2/1969 | Onulak | 59—8 |

CHARLES W. LANHAM, Primary Examiner

G. P. CROSBY, Assistant Examiner

U.S. Cl. X.R.

74—250 R